United States Patent
Wolff

[15] 3,639,774
[45] Feb. 1, 1972

[54] TECHNIQUE FOR STIMULATING THE EMISSION OF FAR-INFRARED RADIATION

[72] Inventor: Peter Adalbert Wolff, Berkeley Heights, N.J.

[73] Assignee: Bell Telephone Laboratories, Incorporated, Murray Hill, N.J.

[22] Filed: July 24, 1970

[21] Appl. No.: 58,004

[52] U.S. Cl. ........................................307/88.3, 321/69 R
[51] Int. Cl. .................................................H03f 7/00
[58] Field of Search ..............................307/88.3; 321/69

[56] References Cited

UNITED STATES PATENTS 3,177,435  4/1965  Marcuse ..................330/56
3,230,466  1/1966  Brett et al. .................330/53
3,398,376  8/1968  Hirshfield .................330/56

*Primary Examiner*—John Kominski
*Assistant Examiner*—Darwin R. Hostetter
*Attorney*—R. J. Guenther and Arthur J. Torsiglieri

[57] ABSTRACT

There is disclosed a method and an apparatus for stimulating the emission of far-infrared optical radiation by backscattering microwaves from a relativistic electron beam having energy in the 1 to 10 Megaelectron-volt range and having direction along a magnetic field of magnitude chosen to make the electron cyclotron frequency approximately equal to the microwave frequency and by resonating the scattered radiation. A van de Graaf generator generates the electron beam.

8 Claims, 1 Drawing Figure

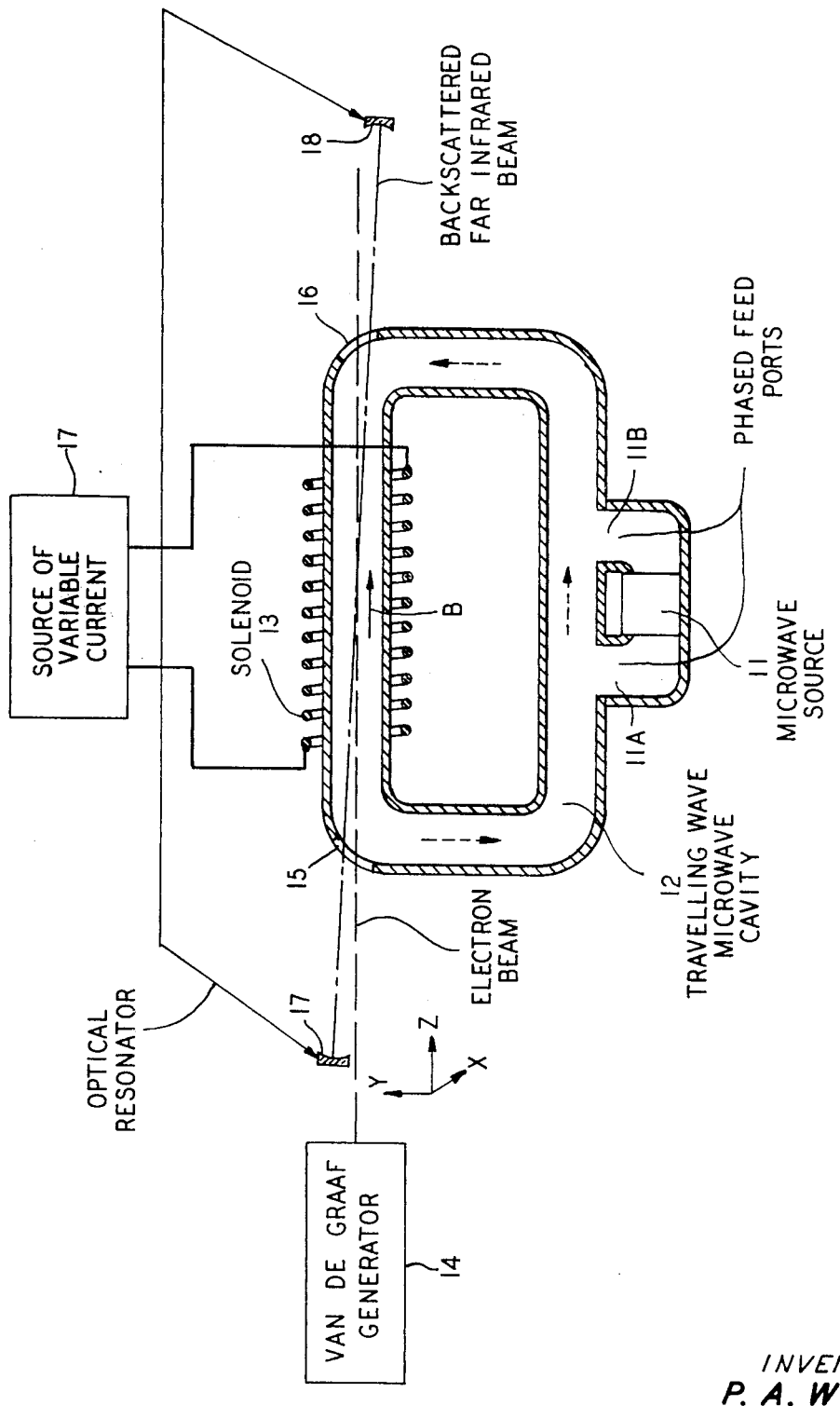

TECHNIQUE FOR STIMULATING THE EMISSION OF FAR-INFRARED RADIATION

BACKGROUND OF THE INVENTION

This invention relates to a method and an apparatus for stimulating the emission of radiation, particularly far-infrared optical radiation.

It is well known that optical techniques provide a powerful tool for the study of matter. In addition, the development of the laser and related sources of coherent radiation has generated great interest both in the properties of optical radiation fields and in a wide variety of possible applications of such fields. These applications include communication.

Yet, despite these facts, there remains an important region of the optical spectrum in which sources of radiation are generally feeble and in which experiments are exceedingly difficult to perform. This region is part of the far infrared and lies between a wavelength of the order of a millimeter and a wavelength of about 50 micrometers. Some years ago, this portion of the spectrum was nearly unexplored. Since then, the development of Fourier transform spectroscopy, which makes optimal use of weak sources, and the invention of devices such as the carcinatron, the hydrogen cyanide (HCN) laser and the water vapor laser have made it more accessible. Also, very recently, optically pumped lasers such as the methyl fluoride laser disclosed in the copending patent application of T. Chang et al., Ser. No. 24,703, filed Apr. 1, 1970, and assigned to the assignee hereof, have been invented. Nevertheless, it remains true that sources of radiation in the far infrared between 100 micrometers and 1,000 micrometers, particularly tunable ones, are inadequate.

SUMMARY OF THE INVENTION

I have invented a method for generating a moderately intense, continuously tunable, coherent source of radiation in this wavelength range. The method of my invention comprises the steps of directing a relativistic electron beam along a magnetic field that makes the cyclotron frequency of electrons therein equal to a supplied microwave frequency seen by the electron in its rest frame, supplying coherent microwave energy to said beam at said frequency to produce backscattered radiation from said beam at a different frequency, and means for resonating said backscattered radiation to produce the stimulated emission of radiation at said different frequency.

More specifically, the method according to my invention includes backscattering microwaves from a relativistic electron beam having a substantially uniform electron energy in the 1 to 10 Megaelectron-volt range and having direction along a magnetic field of magnitude chosen to make the electron cyclotron frequency approximately equal to the microwave frequency and include resonating the scattered radiation. The coincidence of frequencies provides a type of antiStokes scattering which can be characterized as resonant Thomson scattering, although such scattering has never before been proposed for a moving electron beam.

BRIEF DESCRIPTION OF THE DRAWING

Further features and advantages of my invention will become apparent from the following detailed description, taken together with the drawing, in which the sole FIGURE is a partially pictorial and partially schematic illustration of the preferred embodiment of the invention.

DESCRIPTION OF ILLUSTRATIVE EMBODIMENT

In the embodiment of the drawing, it is desired to obtain a moderately intense, continuously tunable, coherent source of radiation in the far infrared from a source of microwaves at much longer wavelength. The microwave source is shown as source 11 in the drawing. This source is coupled to a traveling wave microwave cavity 12 at the ports 11A and 11B, which phase the microwaves from source 11 to launch a traveling wave to the right in cavity 12. In the upper arm of cavity 12 the microwave field is propagating to the left through a region surrounded by a solenoid 13, while a relativistic electron beam propagates to the right from a van de Graaf generator 14 along the axis of the solenoid 13. Suitable windows 15 and 16 are provided in the ends of the upper arm of the microwave cavity in order to permit the backscattered far-infrared radiation to pass therethrough between the reflectors 17 and 18 of a resonator for the far-infrared radiation.

While the microwave field could be injected into the apparatus from the right without being guided by the cavity 12, confinement of the microwave field in this manner facilitates its efficient utilization. Higher fields result for a given input power because of the cavity. Also, it may be feasible to substitute some other source of high-energy electrons for the van de Graaf generator 14; but the van de Graaf generator 14 is definitely preferred at the present time because of the narrow energy range it permits to electrons in the beam transmitted from it. A relatively narrow electron energy range is highly desirable, even though it is desirable to be able to change this energy along with the magnetic field to achieve tuning. The van de Graaf generator provides this capability. It should be understood that the solenoid 13 is readily energized from a source 19 of variable current.

The operation of my invention can be described briefly as follows. The increase in frequency of the scattered radiation with respect to the incident radiation is a Doppler shift upwards in frequency because the electron beam and the supplied microwave field are propagating in antiparallel directions.

A more detailed and mathematical description follows.

The basic technique of anti-Stokes backscattering has previously been used to generate X-rays by backscattering a ruby laser beam from highly relativistic electrons, as described in the article by H. H. Bingham et al., *Physical Review Letters*, Vol. 23, page 498 (Sept. 1, 1969). In such experiments, however, the X-ray beam is produced by spontaneous scattering. Therefore, it is relatively weak and incoherent. By contrast, I have recognized that with microwave excitation and resonant scattering it is feasible to attain stimulated anti-Stokes backscattering.

Several factors combine to reduce the stimulated scattering threshold to a reasonable value in the far-infrared range. Perhaps most important is the well-known fact that the threshold for stimulated scattering at a frequency $\omega_s$ varies inversely with the density of electromagnetic modes at this frequency, that is, as $\omega_s^{-2}$. This factor greatly favors low-frequency scattering such as that we are considering. Secondly, in the microwave region exceedingly powerful sources are available to provide the electromagnetic field which is backscattered; their photon fluxes can be further increased by the use of high Q cavities or resonators.

Finally, with microwave or far-infrared excitation, it is possible to enhance greatly the electron photon scattering cross section by using a form of resonance. This enhancement is achieved by performing the scattering in a magnetic field aligned parallel to the electron propagation direction. The magnitude of this field is chosen to make the electron cyclotron frequency approximately equal to the microwave frequency, as seen in the electron rest frame of reference. Under such conditions, there is a large enchancement of the electron-photon scattering cross section. This effect is a form of resonant fluorescence. It has sometimes been called magneto-Thompson scattering. Under reasonable experimental conditions, the resonant enhancement can provide as much as a millionfold increase of the scattering cross section over the nonresonant value.

It is reiterated, for emphasis, that this enhancement of cross section, as well as the other favorable factors mentioned above, are all required to achieve a reasonable value of the threshold for stimulated backscattering.

KINETICS OF ELECTRON SCATTERING

The essential features of the operation of the machine we propose will now be discussed in more detail with reference to the drawing. Here, a moderately relativistic electron beam (energy 1–10 Mev.) travels in the +z direction, and intercepts an oppositely directed microwave beam. The interaction region is in a uniform, z-directed magnetic field whose value is adjusted to achieve cyclotron resonance. Some of the photons are backscattered from the electron beam into the +z direction. Their final energy is higher than that of the incident photons because of the Doppler effect. The magnitude of this frequency shift can easily be estimated. In the transformation to the electron rest frame, the photon energy is increased by the factor $$(\omega_1/\omega_0) = \gamma(1+\beta), \quad (1)$$

where $\omega_0$ is the frequency of the incident photon, $\omega_1$ is the photon frequency in the electron rest frame, $\beta = v/c$ where $v$ is the electron velocity, and $\gamma = (1-\beta^2)^{-1/2}$. The photon $\omega_1$ (whose energy is small compared to $mc^2$) scatters essentially elastically in this coordinate system. After transforming back to the laboratory frame, one finds that the frequency of backscattered photons is $$(\omega_s/\omega_0) = \gamma^2(1+\beta)^2 = (1+\beta/1-\beta) \quad (2)$$

For electrons whose energies are appreciably greater than $mc^2$, equation (2) can be rewritten in the form:

$$(\omega_s/\omega_0) = (2E/mc^2)^2, \quad (3)$$

where $E$ is the total electron energy. This formula indicates, for example, that electrons of about 8 Mev. are required to frequency shift 10-cm. microwaves to the 100-micrometer range $(\omega_s/\omega_0 = 1,000)$.

It is also important to consider the angular distribution and differential cross section of the scattering. In the electron rest frame, the distribution is the well-known dipole scattering intensity with a differential cross section $d\sigma/d\Omega = (e^2/mc^2)^2$ for backscattering. This distribution becomes sharply peaked in the +z direction when one transforms to the laboratory frame. The effect is a purely kinematic one, resulting from the fact that a scattering angle $\theta_1$ in the rest frame transforms into a scattering angle $$\theta_s = \sqrt{\frac{1-\beta}{1+\beta}}\,\theta_1$$

in the laboratory frame (this result is valid for $\theta_1 \ll 1$). The upshot is an enhancement of the cross section for backscattering in the laboratory frame by a factor $(1+\beta/1-\beta)$, as compared to the electron rest frame. Thus, in the laboratory frame, the differential cross section for backscattering is $$\frac{d\sigma}{dr} = \left(\frac{1+\beta}{1-\beta}\right)\left(\frac{e^2}{mc^2}\right)^2. \quad (4)$$

Equation (4) applies when there is no magnetic field ($B=0$).

In the presence of a field, the cross section is enhanced by cyclotron resonance. The optimal case is that in which the fields are circularly polarized in such a way as to couple to that electron's cyclotron motion. A simple calculation then shows that, for the geometry we are considering, the differential cross section for backscattering becomes $$\frac{d\sigma}{dr} = \left(\frac{1+\beta}{1-\beta}\right)\left(\frac{\omega_1}{\omega_1-\omega_c}\right)^2\left(\frac{e^2}{mc^2}\right)^2, \quad (5)$$

where $\omega_c = eB/mc$ is the electron cyclotron frequency and $\omega_1$ (see equation (1)) is the frequency seen by the electron in its rest frame. This is the expression we will use in estimating Raman gain, below. To my knowledge, the resonant enhancement of light scattering via cyclotron resonance described by equation (5) has not been discussed in sufficient detail in the literature, though the effect is fairly well known, a phenomenon which may be termed "magneto-Thomson scattering." See the *Proceedings of the Ninth International Conference on the Physics of Semiconductors*, (Moscow) Publishing House "Nauka," Leningrad (1968) in the paper by B. Lax, at page 253.

Finally, we estimate the magnetic field strengths required to achieve cyclotron resonance in the electron rest frame ($\omega_1 = \omega_c$). For the example discussed above ($\lambda_0 = 2\pi c/\omega_0 = 10$ cm., $\lambda_s = 2\pi c/\omega_s = 100\mu$) one finds that cyclotron resonance is achieved if $B \sim 40$ kilogauss. Such fields are now readily attainable with superconducting solenoids. Lower electron energies and lower fields are, of course, required to produce scattered wavelengths (and resonance) at longer wavelengths than 100 micrometers.

RAMAN GAIN

Using the formulas and concepts of the preceding section, we can now derive an expression for the Raman gain. This quantity is defined as the logarithmic derivative of the scattered photon intensity with respect to distance. It is also equal to ($1/c$ ×the net rate of photon scattering per mode of the scattered field). In calculating this scattering rate, one must take account of the fact that both forward ($\omega_0 \to \omega_s$) and reverse ($\omega_s \to \omega_0$) scattering processes can occur. The gain is determined by their difference, which is much smaller than the individual forward or reverse processes. This effect leads to a term similar to the usual Boltzmann factor in the expression for the Raman gain.

It is important, in discussing this problem, to specify the velocity (or momentum) distribution of the electrons which cause the scattering. We will assume that they have an average momentum, $p$ (with corresponding velocity $v$) and a small spread, $\Delta p$ ($\Delta p \ll p$), about this average value. These are z-components of momentum. Transverse momenta will be ignored, since they only produce a small, second-order Doppler shift.

Let us now focus our attention on scattering processes in which a photon of frequency $\omega_0$ backscatters to energy $\omega_s$. This frequency shift is produced by those electrons with velocity $$\beta = (v_z/c) = (\omega_s - \omega_0/\omega_s + \omega_0), \quad (6)$$

a result which is obtained by rewriting equation (2). The corresponding momentum is $$p_z = \frac{mv_z}{\sqrt{1-(v_z/c)^2}} \quad (7)$$

Of course, for appreciable scattering to occur at frequency $\omega_s$, there must be some electrons with momentum $p_z$, i.e., $p_z$ must be fairly close to $p$. However, we do not require that $p_z = p$ exactly. As these electrons scatter light, they recoil to a new momentum $$p_z' = p_z - (\hbar\omega_s/c) \quad (8)$$

There is also a reverse process in which photons of frequency $\omega_s$, traveling in the +z direction, backscatter against electrons of momentum $p_z'$ to frequency $\omega_0$ (in the −z direction). The Raman gain is determined by the difference of these scattering rates, divided by the number of modes of the scattered field in the frequency range of interest. For electrons in the momentum interval $dp_z$ (at $p_z$), the number of modes in question is $$\frac{k_s^2}{(2\pi)^3}\frac{dk_s}{dp_z}dp_z \quad (9)$$

where $k_s = \omega_s/c$. Thus, we obtain the following expression for the Raman gain:

$$G = \frac{1}{c}\left\{\frac{(2\pi)^3}{k_s^2\left(\frac{dk_s}{dp_z}\right)}\left(\frac{1+\beta}{1-\beta}\right)\left(\frac{\omega_1}{\omega_1-\omega_c}\right)^2\left(\frac{e^2}{mc^2}\right)^2 \right.$$

$$\left. \times N_0 n_e\,[f(p_z) - f(p_z')]\right\}, \quad (10)$$

where $N_0$ is the photon flux (at frequency $\omega_0$) and $n_e$ the electron density in the interaction region. This expression assumes that $f(p_z)$ is normalized:

$$\int_{-\infty}^{\infty} f(p_z)dp_z = 1. \tag{11}$$

Since $(p_z - p_z')$ is small, one may approximate $$[f(p_z) - f(p_z')] \cong \hbar k_s \frac{\partial f}{\partial p_z} = \frac{\hbar k_s}{(\Delta p)^2} F, \tag{12}$$

where $F$ is a dimensionless function of $(p_z - p/\Delta p)$. At its maximum, it will have a value (depending to some extent on the shape of the momentum distribution) of order unity. To calculate $dk_s/db_z$, we use equations (2) and (7) as follows:

$$\frac{dk_s}{dp_z} = \frac{1}{c}\frac{d\omega_s}{dp_z} = \frac{2}{(1-\beta^2)}\frac{\omega_o}{c^2}\frac{dv_z}{dp_z} = 2(1-\beta^2)^{1/2}\frac{k_s}{mc} \tag{13}$$

Finally, for relativistic electrons, $\Delta E \sim c\Delta p$, where $\Delta E$ is the energy spread of the electron beam. Combining equations (10), (12), and (13) yields the following formula for the gain:

$$G = \frac{1}{c}\lambda_1^3 N_o n_e \left(\frac{\omega_1}{\omega_1 - \omega_c}\right)^2 \left(\frac{e^2}{mc^2}\right)^2 \times \left(\frac{\hbar\omega_s}{\Delta E}\right)\left(\frac{mc^2}{\Delta E}\right)\frac{F}{2(1+\beta)}, \tag{14}$$

where $\lambda_1$ is the wavelength of the photons in the electron rest frame. Equation (14) is the major result of this analysis. It has here been derived in a rather intuitive way. However, a detailed calculation, proceeding from the Boltzmann equation, of the third order optical nonlinearity which is responsible for stimulated Raman scattering, confirms equation (14). Since this calculation is quite lengthy, and follows standard lines, it will not be presented here.

It is important to notice that, in equation (14), $G$ varies as $(\Delta E)^{-2}$. Thus, monochromaticity of the electron beam is a crucial requirement in achieving stimulated magneto-Thomson scattering.

We calculate the gain that might be achieved under reasonable experimental conditions as follows. For this estimate we have used the following parameters: $(\omega_1/\omega_1 - \omega_c) = 10^3$—this requires a field homogeneity of 0.1 percent.

$\Delta E = 1,000$ ev.
Beam current$=10^{-3}$ amp./cm.$^2$
($n_e \approx 2 \times 10^5$ electrons/cc.)
$\lambda_s = 100\mu$
$\lambda_o = 10$ cm.
Microwave power $= 1$ kw./cm.$^2$
($N_o \approx 5 \times 10^{26}$ photons/cm.$^2$ sec.

With these numbers, the gain calculated from equation (14) is about $5 \times 10^{-3}$ cm.$^{-1}$. If the interaction region between the electron and microwave beams is 10 cm. long, CW Raman laser action can be achieved if the scattered IR light is confined within a resonator 17, 18 whose mirrors have 97.5 percent reflectivity. Such cavities can certainly be built.

The figures for microwave power, beam current, energy definition and field homogeneity assumed above all seem within the present state of the art. The most difficult to achieve is the electron beam current of 1 milliamp (at several Mev.) with an energy spread of 1,000 ev. or less. Such beams can probably be obtained from a well-stabilized van de Graaf. However, it would be very useful to be able to relax these requirements—particularly as to beam current. Smaller electron beam currents and/or poorer energy definition could be compensated by increasing the microwave photon flux, $N_o$. A convenient way to do this might be with a traveling wave cavity, as illustrated schematically in the drawing. Here the electron beam passes through holes in the cavity, scattering from the circulating microwave fields. A traveling wave cavity is required to insure that the microwave radiation has a well-defined wave vector. This condition is necessary since the Doppler shift is related to the wave vector.

The advantage of the geometry illustrated in the drawing is that the microwave cavity Q can be used to enhance the circulating microwave power, without a corresponding increase in input power. At room temperature $Q=100$ is not unreasonable; higher $Q$'s might be obtained at low temperatures.

The preceding calculations suggest that CW, stimulated Raman scattering of microwave photons from a relativistic electron beam is achievable. Though our estimates of Raman gain are encouraging, it seems premature at this time to attempt a detailed design of the CW device. A more fruitful approach is probably to test the basic idea—particularly the concept of magnetic field enhancement of the cross section—in a pulsed experiment. Microwave powers exceeding a megawatt, and much larger electron beam currents than those we have visualized, are attainable in pulsed operation. These high powers would permit considerable relaxation of the restriction on electron energy spread ($\Delta E \approx 1,000$ ev.) and the condition on magnetic field homogeneity required to maintain cyclotron resonance ($\Delta B/B \approx 10^{-3}$).

I claim:
1. A method for stimulating the emission of radiation, comprising the steps of
    supplying an electron beam aligned with a magnetic field making the cyclotron frequency of electrons therein equal to a first frequency,
    supplying coherent microwave energy to said beam at substantially said first frequency to produce backscattered radiation from said beam at a different frequency, and
    resonating said backscattered radiation to produce the stimulated emission of said radiation at said different frequency.

2. A method according to claim 1 in which the electron beam-supplying step comprises supplying the electron beam with a substantially uniform electron energy lying in the range between 1 and 10 Megaelectron volts.

3. A method according to claim 2 in which the microwave energy-supplying step comprises guiding the microwave energy in a traveling waveform to propagate substantially antiparallel to and substantially collinearly with the electron beam throughout a selected pathlength of said beam.

4. A method according to claim 3 in which the guiding step includes resonating said microwave energy in said traveling waveform.

5. An apparatus for stimulating the emission of radiation, comprising
    means for establishing a magnetic field,
    means for supplying an electron beam in which electrons have substantial kinetic energies of nearly equal values and velocities collinear with said field,
    means for supplying coherent microwave energy to said beam at a frequency substantially equal to the cyclotron frequency of said electrons in said magnetic field to produce backscattered radiation from said beam at a different frequency, and
    means for resonating said backscattered radiation to produce the stimulated emission of said radiation at said different frequency.

6. An apparatus according to claim 5 in which the electron beam-supplying means comprises a van de Graaf generator supplying the electron beam with substantially uniform electron energy lying in the range between 1 and 10 Megaelectron volts.

7. An apparatus according to claim 6 in which the microwave energy-supplying means comprises a loop-type traveling wave microwave resonator including openings for passing the electron beam and the scattered radiation, said microwave energy-supplying means including means for launching said microwave energy in said resonator to propagate antiparallel to said electron beam while substantially collinear therewith.

8. An apparatus according to claim 7 in which the microwave energy-launching means launching microwave energy having a wavelength between about 2 and 20 centimeters and the means for establishing a magnetic field includes a variable current source capable of varying said field to maintain the electron cyclotron frequency equal to the microwave frequency.

* * * * *